Sept. 23, 1958  W. O. OLSON ET AL  2,852,903
MOWER ASSEMBLY
Filed March 12, 1956  3 Sheets-Sheet 1

INVENTOR.
WILLIAM O. OLSON
LYLE L. OLSON
BY WERNER A. KEHRLI, SR.
Kimmel & Crowell
ATTORNEYS

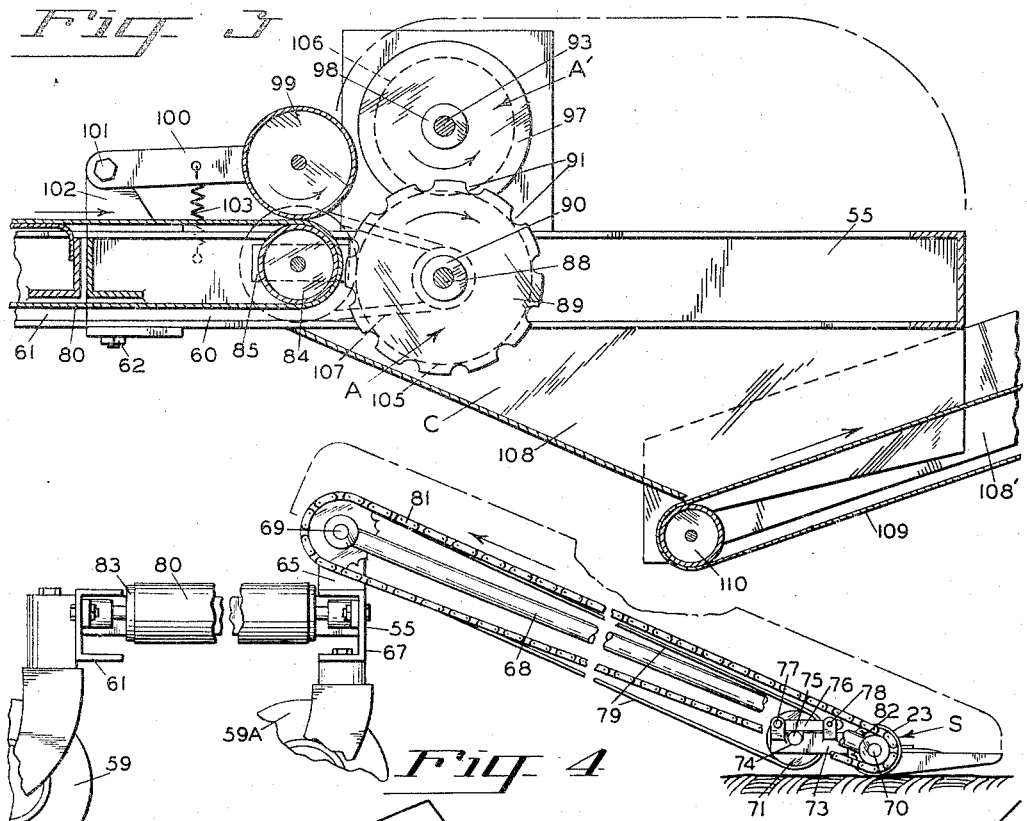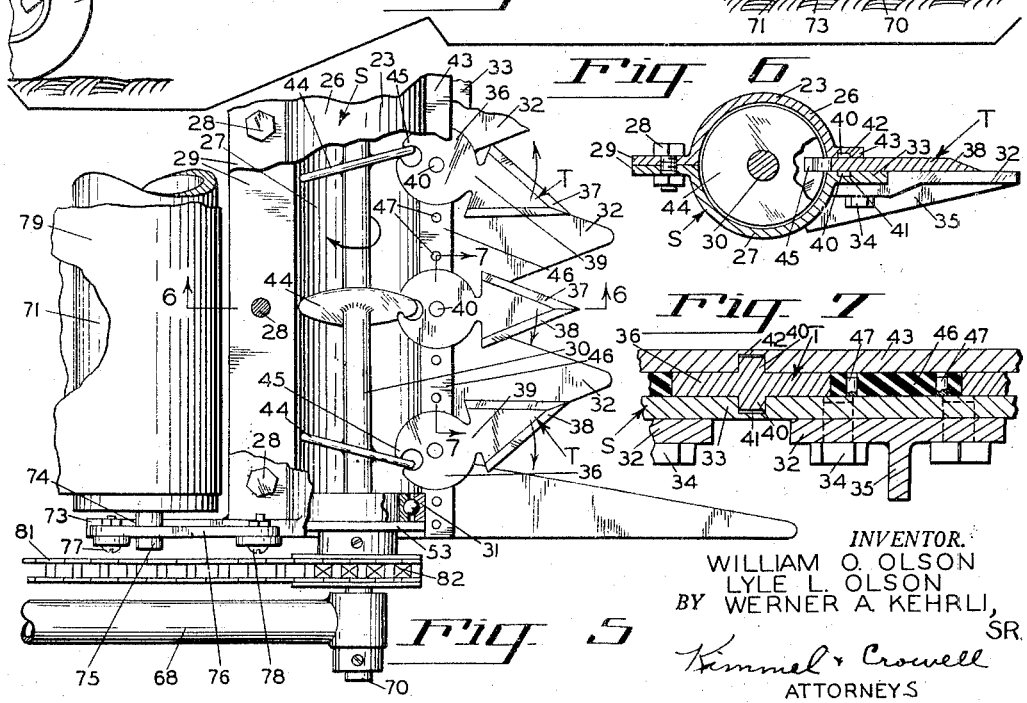

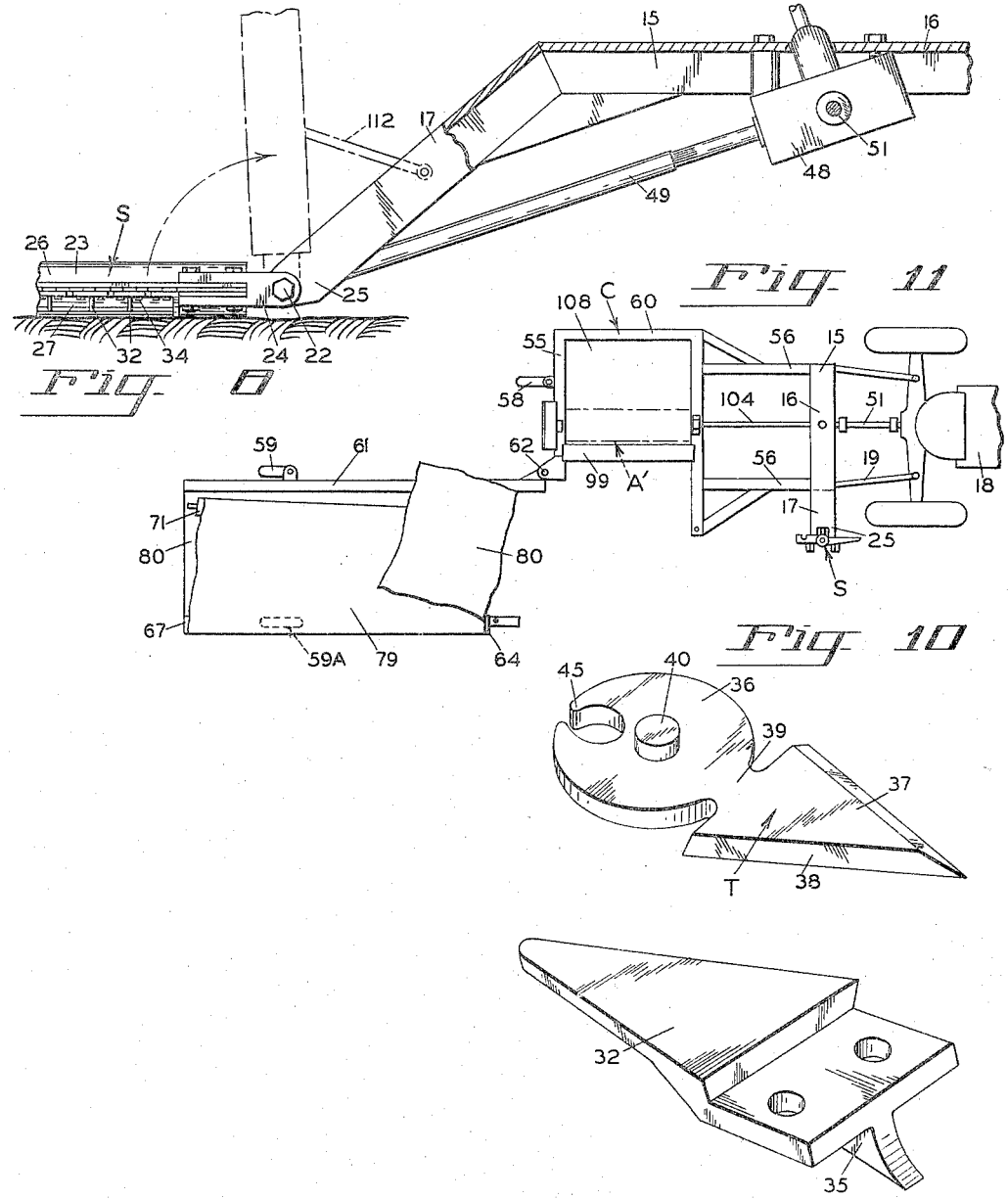

United States Patent Office 2,852,903
Patented Sept. 23, 1958

2,852,903
MOWER ASSEMBLY

William O. Olson, Lyle L. Olson, and Werner A. Kehrli, Sr., Molalla, Oreg.

Application March 12, 1956, Serial No. 570,733

1 Claim. (Cl. 56—293)

This invention relates to a combination mowing and chopping machine of the type adapted for mowing stock type of feed, such as hay and the like, and simultaneously therewith chopping or cutting the same into small pieces so that it can be stored in silos and the like.

At the present time the conventional system of cutting feed and converting the same into forage or ensilage, utilizes complicated chopping machines wherein the mowing arrangement forms part of the machine and cannot be removed or is a separate machine.

My new and improved combination mowing and chopping machine performs the mowing and chopping operations simultaneously. From the chopper the chopped feed is delivered into trucks and delivered to the silo, saving considerable expense and time.

Other objects and advantages will become apparent in the following specification when considered in the light of the attached drawings, in which:

Figure 3 is an enlarged fragmentary transverse section taken along the line 3—3 of Figure 1, looking in the direction of the arrows, illustrating the chopping mechanism within the chopper.

Figure 4 is an enlarged fragmentary end elevation of the cutting bar of the mower, elevating conveyor and looking into the end of the conveyor leading to the cutting head of the machine, parts broken away for convenience of illustration.

Figure 5 is an enlarged fragmentary plan view of the cutting bar of the mower and elevator, parts broken away for convenience of illustration.

Figure 6 is a fragmentary vertical cross-section taken along the line 6—6 of Figure 5, looking in the direction of the arrows.

Figure 7 is an enlarged fragmentary transverse section taken along the line 7—7 of Figure 5, looking in the direction of the arrows.

Figure 8 is an enlarged transverse section of the sickle bar, taken along the line 8—8 of Figure 1, looking in the direction of the arrows, with parts broken away for convenience of illustration, the chopper and cutting machine omitted.

Figure 9 is an enlarged perspective view of one of the sickle guards associated with the cutter bar.

Figure 10 is an enlarged perspective view of one of the cutting teeth associated with the sickle bar.

Figure 11 is a diagrammatical plan view of the machine in inoperative or folded position for transporting from place to place.

Figure 1:
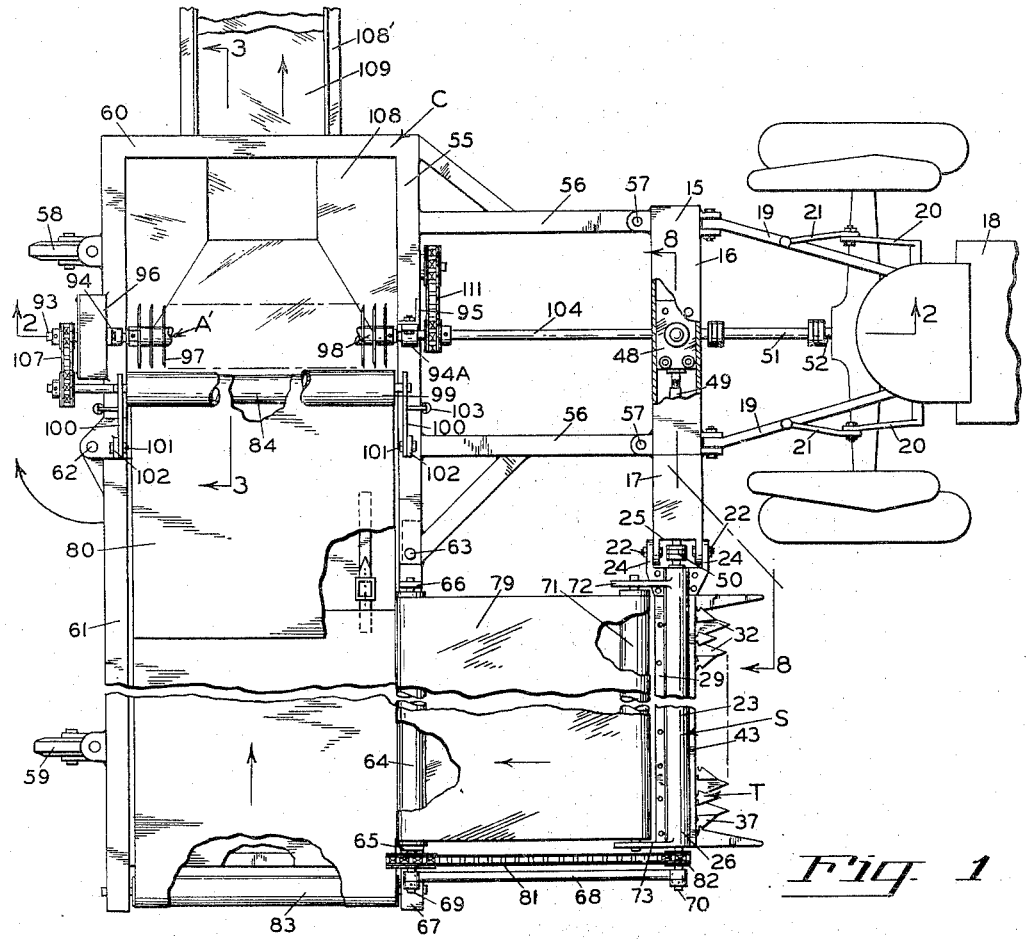
Figure 1 is a fragmentary plan view of the mowing and chopping machine embodying the invention, with parts broken away and in section.

Referring now to the drawings in detail wherein like reference numerals indicate like parts throughout the several figures, we will first describe the construction and operation of the mower S for cutting the feed from its stand in the field. The mower S consists of a frame 15 having a horizontal portion 16 and a downwardly inclined portion 17. The horizontal portion 16 is connected to a tractor 18 by the usual draw bars 19 of the tractor 18. The frame 15 is raised and lowered by the hydraulic lifting arms 20 by the links 21. This is the usual practice with tractors of this type.

A mower assembly S is pivotally connected to the lower end of the frame 15 by the pivot bolts 22. The bolts 22 are best illustrated in Figures 1 and 8. The mower assembly S includes an elongated tubular cutter bar 23. Arms 24 form part of the tubular cutter bar 23 and are pivotally secured to the bifurcated end 25 of the inclined portion 17 of the frame 15 by bolts 22, as above described.

Referring to Figures 1, 5 and 6, the tubular cutter bar 23 consists of a pair of upper and lower semi-cylindrical members 26 and 27 held together by the bolts 28 extending through their flanges 29 integrally formed on one side thereof. Running longitudinally within the tubular cutting bar 23 is a shaft 30. The shaft 30 is journalled by bearings 31 in either end of the cutter bar 23 and may be supported intermediately thereof by other supporting bearings (not shown).

Referring to the above figures, and including Figure 9, sickle guards 32 are bolted to the flange 33 of the lower member 27 of the body member 23 by the bolts 34. The guards 32 are reinforced by the web 35 which also acts as a runner for passing over obstructions in the way of the mower S.

Referring to Figures 1, 5, 6, 7 and 10, the cutting teeth T consist of a disk portion 36, having a V-shaped cutting blade 37 forming part thereof. The cutting blade 37 has the usual bevel 38 bordering the same and is connected to the disk 36 at 39, the portion 39 being relatively narrow in regards to the disk 36 and the blade 37. The purpose of this narrow portion 39 is to protect the driving mechanism in the event that the teeth T strike a serious obstruction. Stub shafts 40 form part of and extend vertically on either side of the disk 36 and enter bearing bores 41 in the flange 33 of the lower member 27 of the mower S and bearing bores 42 within the flange 43 of the upper half 26 of the tubular cutter bar 23.

Cams in the form of disks 44 are formed integral with the shaft 30 and are mounted to the shaft 30 at an angle to provide an oscillating or wobbling movement about the periphery. These disk cams 44 operate between the jaws 45 of the disk 36 of the cutter teeth units T, and as the shaft 30 is revolved these cams or disks 44 oscillate the teeth T about the stub shafts 40, as best illustrated in Figure 5.

Compressible seals 46 are secured to the flange 33 of the mower S by any suitable means, such as pins 47. The seals 46 retain lubrication within the mower S in the operation of the same, yet allowing the lubrication to reach the moving parts in their operation.

Referring to Figures 1 and 8, the shaft 30 is driven from the gear box 48 by the telescopical drive shaft 49 and through the universal coupler 50. The gear box 48 is in turn driven by the shaft 51 from the power take-off 52 of the tractor 18. The above described mower assembly S is smooth of operation due to the rotary action of its mechanism. The lubrication is sealed within the mower S by the compressible seals 46 and also the oil seals 53 located in either end of the mower S, best illustrated in Figures 5 and 7.

The construction and operation of the chopper or cutting machine C will now be described. The chopper or cutting machine C consists of a rectangular frame 55 connected to the mower frame 15 through the forwardly extending frame members 56 by any suitable means, such as the king pins 57. The frame 55 is also supported upon caster wheel assemblies 58, 59 and 59A, best illustrated in Figures 1, 2, 4 and 11. The frame 55 consists of two parts 60 and 61 hinged on their rear side at 62 and locked together on their forward side by the king pin 63 so that the same can be folded back as illustrated in Figure 11.

A canvas elevator roller 64 is journalled to the upper side of the frame 55 by the bearing brackets 65 and 66. The outer end 67 of the frame 55 is connected to the mower S by the draw bar 68, having one of its ends journalled to the shaft 69 of the roller 64 and its opposite end journalled to the extension 70 of the sickle bar shaft 30.

Located adjacent to the rear of the mower S is a canvas elevator roller 71 supported by the bearing brackets 72 and 73 forming part of the mower assembly S. The bearing bracket 73 has a U-shaped bearing 74 formed thereon within which the shaft 75 of the roller 71 operates. A locking bar 76 is pivotally mounted at 77 to the bracket 73 and is locked down against the shaft 75 by the locking pin 78, referring particularly to Figures 4 and 5.

A conveyor belt 79 is trained about the roller 71 and the roller 64 and is adapted to elevate the cut material, such as hay or other feed material up onto the horizontal conveyor 80. The roller 64 is driven by the chain 81 from the shaft 30 by the driving sprocket 82. The horizontal conveyor belt 80 operates over the roller 83 which is journalled to the outer end 67 of the frame 55 and the roller 84 which is journalled within bearings 85 secured to the frame 55, referring to Figure 3.

Figure 2:
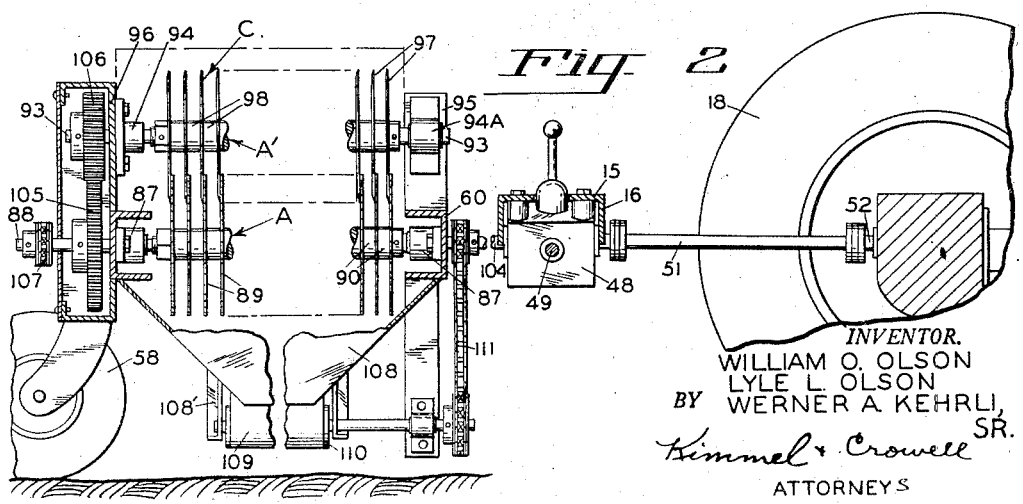
Figure 2 is an enlarged longitudinal cross-section taken along the line 2—2 of Figure 1, looking in the direction of the arrows, particularly illustrating the chopping or cutting machine in relation to the tractor, parts broken away for convenience of illustration.

We will now describe the chopping or cutting mechanism, which consists of the arbor A, which is journalled within bearings 87 which are secured to the frame 55, referring particularly to Figures 1, 2 and 3. The arbor A consists of the shaft 88, which has disks 89 fixedly secured thereto and spaced apart by the spacers 90. The disks 89 have cut-out portions 91 around their periphery, the object of which will be described later. Journalled above the arbor A is another arbor A', consisting of the shaft 93 which is journalled within the bearings 94 and 94A, which in turn are mounted to the brackets 95 and to the gear housing 96, referring to Figure 2.

Cutting disks 97 are mounted to the shaft 93 and are spaced apart by the spacers 98. The sides of these cutting disks are adapted to engage one of the sides of the disks 89, the operation of which will be later described.

A press down drum 99 is journalled to the arms 100, which are pivotally mounted at 101 to the brackets 102 forming part of the frame 55. Springs 103 pull down on these arms 100 putting a pressure on the mowed hay or the like being fed over the conveyor belt 80 directly above the drive roller 84, as best illustrated in Figure 3.

The shaft 88 is driven by the counter shaft 104 which in turn is driven from the gear box 48. The shaft 93 of the arbor A' is driven from the shaft 88 by way of the gear 105 which is keyed to the shaft 88, and the gear 106, which is keyed to the shaft 93, referring particularly to Figure 2.

The conveyor roller 84 is driven from the shaft 88 by the chain drive 107, referring to Figures 1 and 2. Located under the chopping or cutting mechanism C is a hopper 108. Located at the bottom of this hopper 108 is a conveyor 108' consisting of the conveyor belt 109 which is rotated by the roller 110, which in turn is driven from the counter shaft 104 by the chain 111, referring to Figures 1 and 3.

The operation of this new and improved combination mower and chopping machine will now be described. The cutter teeth T are oscillated by the cam disk 44 through the shaft 30. The shaft 30 is rotated by the power take-off 52 of the tractor through the gear box 48, shaft 49 and universal coupling 50, cutting hay or other types of material.

In the event the mower S is used in combination with our chopping machine, the cut material falls on the elevator belt 79, which is driven in the direction of the arrow by the drive chain 81 from the shaft 30 through the driven roller 64 onto the horizontal conveyor belt 80. The horizontal conveyor belt 80 moves the material towards the chopping or cutting mechanism C. The hold down roller 99 assisting the conveyor belt 80 in delivering the material into the notches or cut-out portions 91 formed in the disks 89, which are driven in the direction of the arrow. This lifts the material to a position where the periphery of the cutting disks 97 cuts the material in short pieces and delivers it into the hopper 108 from where it is delivered by the conveyor belt 109 up to a rack (not shown) mounted upon a truck or the like.

The disks 89 are driven by the counter shaft 104 from the gear box 48 through the shaft 88 and the conveyor belt 80 is driven by the roller 84 by the chain 107 from the shaft 88. The hold down roller 103 is driven by contact with the conveyor belt 80 and as above described, the cutting disks 97 are driven by their shaft 93 through the gears 105 and 106 from the shaft 88. The disks 97 are driven at a relatively high speed in relation to the feeding disks 89.

When it is desired to move the mower and chopper combination machine over the highway, the draw bar 68 is removed from the sickle bar shaft 30 and hinged back over the conveyor 80. The pin 78 is removed from the locking pin 76 and the shaft 75 is removed from its bearings 74 and the opposite end of the roller is removed from its bearing 72, folded back onto the conveyor 80. The king pin 63 is removed and the frame section 61 is hinged backward together with the conveyor 80, as illustrated in Figure 11, first having disconnected the conveyor belt 80 as illustrated.

The mower S can be raised to the broken line position, Figure 8, and held in place by the hook 112 until again lowered to be used in cutting. The universal coupler 50 is of a design to permit the raising of the mower S to this vertical position.

Having thus described the preferred embodiment of the invention, it should be understood that numerous modifications and structural adaptations may be resorted to without departing from the scope of the appended claim.

What is claimed is:

A mower assembly comprising a tubular cutter bar including upper and lower semi-cylindrical members, a first flange integrally formed on one side of each of said members, means detachably securing said first flanges together, a second flange integrally formed on the side of said lower member opposite said first flange thereon, a plurality of sickle guards positioned beneath said second flange in longitudinally spaced relation, means detachably securing said sickle guards to said second flange, a second flange integrally formed on the side of said upper member opposite said first flange thereon, said second flanges lying in spaced apart parallel relation, said second flanges having a plurality of longitudinally spaced pairs of vertically aligned bearing bores formed therein, a plurality of longitudinally spaced disks positioned between said second flanges, a stub shaft integrally secured axially to each of said disks and engaging respectively in said bearing bores, a flexible seal positioned between said second flanges between adjacent disks, a cutting blade fixed to each of said disks for cutting cooperation with said sickle guards, an elongated shaft in said cutter bar, bearings journalling opposite ends of said shaft in opposite ends of said cutter bar, said bearings sealing the opposite ends of said cutter bar, a plurality of cam disks fixed in longitudinally spaced relation on said shaft, means on each of said first named disks engaging one of said cam disks whereby on rotation of said shaft said first named disks and said cutting blades fixed thereto are swung in an oscillating motion about said stub shaft.

References Cited in the file of this patent

UNITED STATES PATENTS

| | | |
|---|---|---|
| 15,672 | Stoddard | Sept. 2, 1856 |
| 225,703 | Hanson | Mar. 23, 1880 |
| 264,449 | Fahs | Sept. 19, 1882 |
| 536,695 | Hall | Apr. 2, 1895 |
| 1,280,686 | Doremire | Oct. 8, 1918 |
| 1,717,931 | MacGregor | June 18, 1929 |

FOREIGN PATENTS

| | | |
|---|---|---|
| 260,241 | Switzerland | July 16, 1949 |